(12) United States Patent
Miller (10) Patent No.: US 11,424,816 B2
(45) Date of Patent: Aug. 23, 2022

(54) COMMUNICATION MODULE FOR TRANSMISSION OF AIRCRAFT DATA

(71) Applicant: PRATT & WHITNEY CANADA CORP., Longueuil (CA)

(72) Inventor: Jonathan Mark Miller, Natick, MA (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 878 days.

(21) Appl. No.: 15/980,360

(22) Filed: May 15, 2018

(65) Prior Publication Data

US 2020/0028571 A1 Jan. 23, 2020

(51) Int. Cl.
| | |
|---|---|
| H04B 7/185 | (2006.01) |
| B64D 45/00 | (2006.01) |
| G08G 5/00 | (2006.01) |
| H04W 84/06 | (2009.01) |

(52) U.S. Cl.
CPC ......... *H04B 7/18508* (2013.01); *B64D 45/00* (2013.01); *G08G 5/0004* (2013.01); *H04W 84/06* (2013.01)

(58) Field of Classification Search
CPC ..... B64D 11/0015; B64D 43/00; H04B 7/185
USPC ........................................................ 244/75.1
See application file for complete search history.

(56) References Cited

U.S. PATENT DOCUMENTS

| | | | | |
|---|---|---|---|---|
| 5,473,938 A | * | 12/1995 | Handfield | ........... B60C 23/0401 73/146.5 |
| 6,469,621 B1 | * | 10/2002 | Vredevoogd | ....... B60C 23/0408 340/442 |
| 8,195,232 B2 | | 6/2012 | Ying | |
| 8,376,760 B1 | * | 2/2013 | Kostrzewski | ........... G06F 21/85 439/138 |
| 8,768,540 B2 | * | 7/2014 | Stone | ....................... G08G 5/04 701/3 |
| 9,152,182 B1 | * | 10/2015 | McMahon | ............ G06F 1/1658 |
| 9,284,045 B1 | * | 3/2016 | Springer | ................ B64D 43/00 |
| 9,594,716 B1 | | 3/2017 | Nair et al. | |
| 9,601,215 B2 | * | 3/2017 | Ohmaru | .................. H01L 29/24 |
| 9,683,864 B2 | * | 6/2017 | McQuillan | ........... G01C 23/005 |
| 9,831,899 B1 | * | 11/2017 | Boghrat | .................. H03F 3/245 |
| 10,779,444 B2 | * | 9/2020 | Neuman | .............. H05K 7/1422 |
| 10,827,629 B2 | * | 11/2020 | Neuman | .............. H05K 1/0271 |

(Continued)

FOREIGN PATENT DOCUMENTS

| | | |
|---|---|---|
| EP | 1158479 | 11/2001 |
| EP | 2903180 | 8/2015 |

OTHER PUBLICATIONS https://helicoptermaintenancemagazine.com/article/avionics-system-epic-proportions-part-one-two Feb. 1, 2015.*

*Primary Examiner* — Christopher P Ellis
(74) *Attorney, Agent, or Firm* — Norton Rose Fulbright Canada LLP (57) ABSTRACT

Herein provided are methods and systems for method for transmitting data from an aircraft. A communication module for transmitting data from an aircraft comprises: a physical interface for removably coupling the communication module to an aircraft communication system which obtains the data; a data interface for obtaining at least one message for transmission from the aircraft communication system, the at least one message based on the data; and at least one radio for transmitting the at least one message via at least one antenna.

19 Claims, 5 Drawing Sheets

(56) References Cited

U.S. PATENT DOCUMENTS

| | | | |
|---|---|---|---|
| 2005/0156777 A1* | 7/2005 | King | G08G 5/0021 342/29 |
| 2006/0111793 A1* | 5/2006 | Stokes | G05B 15/02 700/3 |
| 2007/0027589 A1 | 2/2007 | Brinkley et al. | |
| 2007/0188130 A1* | 8/2007 | Scheucher | H01M 50/20 320/110 |
| 2011/0174926 A1* | 7/2011 | Margis | B60R 11/0229 244/118.6 |
| 2012/0039048 A1* | 2/2012 | Mondragon | B60R 11/0235 361/733 |
| 2013/0083960 A1* | 4/2013 | Kostrzewski | H05K 7/1427 382/103 |
| 2014/0257597 A1* | 9/2014 | Miller | G06F 13/387 701/3 |
| 2015/0247714 A1* | 9/2015 | Teetzel | G05D 1/107 244/3.11 |
| 2015/0336676 A1* | 11/2015 | McCann | G08G 5/0039 701/3 |
| 2015/0363981 A1 | 12/2015 | Ziarno et al. | |
| 2016/0154391 A1* | 6/2016 | Pavaskar | H04L 41/0803 701/3 |
| 2016/0344792 A1* | 11/2016 | Sinivaara | H04N 21/43637 |
| 2016/0368378 A1* | 12/2016 | Berenbaum | G06Q 10/20 |
| 2017/0036783 A1* | 2/2017 | Snyder | B23K 37/0408 |
| 2017/0054204 A1* | 2/2017 | Changalvala | H01Q 1/2291 |
| 2017/0136904 A1* | 5/2017 | Ricci | B60L 5/42 |
| 2017/0164199 A1* | 6/2017 | Kong | H04W 4/42 |
| 2017/0203856 A1* | 7/2017 | Dunn | H04R 1/28 |
| 2017/0369188 A1* | 12/2017 | Bulumulla | B64D 29/00 |
| 2018/0025149 A1* | 1/2018 | Watson | B60R 16/037 726/2 |
| 2018/0115609 A1* | 4/2018 | Dusik | H04L 67/12 |
| 2018/0157255 A1* | 6/2018 | Halverson | B64C 39/024 |
| 2018/0313877 A1* | 11/2018 | Brant | H01Q 1/36 |
| 2018/0321045 A1* | 11/2018 | Belt | G01C 21/206 |
| 2018/0341528 A1* | 11/2018 | Ovens | G06F 9/5072 |
| 2019/0042000 A1* | 2/2019 | Kasmieh | G06F 1/1686 |
| 2019/0114927 A1* | 4/2019 | McCullough | G08G 5/0086 |
| 2019/0227538 A1* | 7/2019 | Lassini | G06F 11/3013 |
| 2019/0235525 A1* | 8/2019 | Cooper | B63B 45/04 |
| 2019/0304209 A1* | 10/2019 | Huynh | G09G 5/00 |
| 2019/0310661 A1* | 10/2019 | Rysdyk | G05D 1/0206 |
| 2019/0371084 A1* | 12/2019 | Krupa | G07C 5/0841 |
| 2020/0082729 A1* | 3/2020 | Heiberg | G08G 5/0034 |
| 2020/0133894 A1* | 4/2020 | Granier | H05K 7/1412 |
| 2020/0302801 A1* | 9/2020 | Urbanek | H04L 12/40143 |
| 2020/0312157 A1* | 10/2020 | Hawley | G08G 5/0013 |
| 2020/0396602 A1* | 12/2020 | Avila | G06F 1/266 |
| 2020/0410874 A1* | 12/2020 | Jensen | G08G 5/0095 |

\* cited by examiner

COMMUNICATION MODULE FOR TRANSMISSION OF AIRCRAFT DATA

TECHNICAL FIELD

The present disclosure relates generally to aircraft, and more specifically to onboard avionics and communication systems.

BACKGROUND

Modern aircraft are equipped with communication systems which serve to report aircraft data substantially in real-time, even when the aircraft is in the process of performing a flight mission. Although regulatory agencies apply stringent safety certification regulations to these aircraft communication systems, the communication systems often rely simply on consumer-grade transmission technology, including cellular technology, wireless local area networks, and/or satellite technology, which provides the benefit of being able to use off-the-shelf components and allows the communication systems to be integrated with other aircraft systems. Nevertheless, opportunities for improvement exist.

SUMMARY

In accordance with a broad aspect, there is provided a communication module for transmitting data from an aircraft, comprising: a physical interface for removably coupling the communication module to an aircraft communication system which obtains the data; a data interface for obtaining at least one message for transmission from the aircraft communication system, the at least one message based on the data; and at least one radio for transmitting the at least one message via at least one antenna.

In some embodiments, the physical interface is configured for being interchangeably coupled to the aircraft communication system via at least one fastener.

In some embodiments, the communication module further comprises, for each of the at least one radio, a respective radio-frequency connector, wherein each of the at least one radio is coupled to a respective one of the at least one antenna via the respective radio-frequency connector.

In some embodiments, the at least one radio is coupled to the data interface, and wherein transmitting the at least one message via the at least one antenna comprises transmitting the at least one message to the aircraft communication system for transmission via the at least one antenna.

In some embodiments, the at least one radio is configured for transmitting the at least one message over a cellular network.

In some embodiments, the radio is configured for transmitting the at least one message over a satellite network.

In some embodiments, the radio is configured for transmitting the at least one message over a wireless local area network.

In some embodiments, the radio includes at least one subscriber identity module (SIM) card.

In some embodiments, the processing unit is a microcontroller.

In some embodiments, at least some of the physical interface, the data interface, and the at least one radio are certified by at least one of a telecommunication standards organization and an aviation standards organization.

In accordance with another broad aspect, there is provided an aircraft communication system for transmitting data from an aircraft, comprising: a source interface coupled to at least one data source within the aircraft for obtaining the data therefrom; a processing unit for processing the data to identify, within the data, information of interest; and producing at least one message for transmission, the at least one message comprising the information of interest; and a communication module according to the present disclosure which is configured to be coupled to the processing unit.

In accordance with a further broad aspect, there is provided an interface for use in transmitting data from an aircraft, comprising: a first connector configured for physically and removably coupling a communication module to a communication system which obtains the data; a second connector for digitally coupling the communication module to a processing unit of the communication module producing messages for transmission based on the data; wherein the interface is configured for conducting the messages from the processing unit to at least one radio via the second connector.

In accordance with a still further broad aspect, there is provided a method for transmitting data from an aircraft, comprising: interchangeably coupling a communication module to an aircraft communication system via a physical interface; obtaining, via a data interface and from the aircraft communication system, at least one message for transmission, the at least one message comprising information of interest based on the data; and transmitting, via at least one antenna coupled to the communication module, the at least one message.

In some embodiments, removably coupling the communication module to the aircraft communication system comprises fastening the communication module to the aircraft communication system via at least one fastener.

In some embodiments, transmitting the at least one message comprises transmitting the at least one message via a respective radio-frequency connector for each of the at least one antenna.

In some embodiments, transmitting the at least one message comprises transmitting the at least one message to the aircraft communication system for transmission via the at least one antenna.

In some embodiments, transmitting the at least one message comprises transmitting the at least one message over a cellular network.

In some embodiments, transmitting the at least one message comprises transmitting the at least one message over a satellite network.

In some embodiments, transmitting the at least one message comprises transmitting the at least one message over a wireless local access network.

In some embodiments, transmitting the at least one message comprises encoding the at least one message with a unique identifier obtained from at least one subscriber identity module (SIM) card.

In some embodiments, at least some of the steps of receiving, processing, producing, and transmitting are performed using hardware certified by at least one of a telecommunication standards organization and an aviation standards organization.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
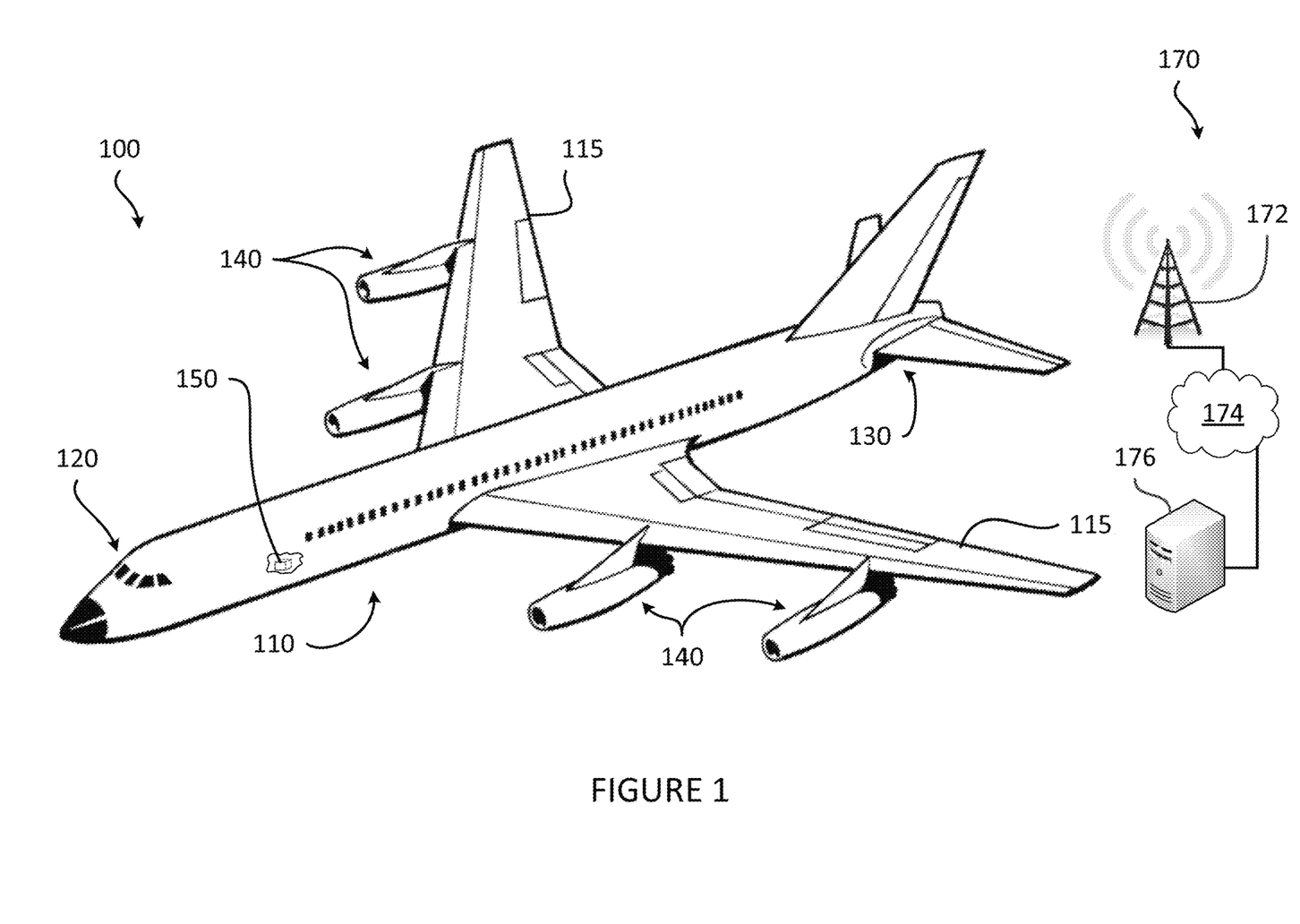
FIG. 1 is a perspective view of an example aircraft.

With reference to FIG. 1, there is illustrated an example aircraft 100 having a fuselage 110 and wings 115. The fuselage 110 includes a cockpit 120 and a tailcone 130, which can be substantially integral to the fuselage 110. The aircraft 100 also includes engines 140 which can be affixed to the wings 115 and/or to the fuselage 110. Although shown in FIG. 1 generally as a turbofan aircraft in which the engines 140 are gas turbine engines, it should be noted that the aircraft 100 can be any suitable type of aircraft having any suitable number of engines of any suitable type.

The aircraft 100 also includes various electronic systems, illustrated in FIG. 1 as aircraft data sources 150. The aircraft data sources 150 can include sensors, whether physical or virtual, meters, control systems, and the like, and is configured for producing aircraft data which is indicative of various parameters associated with the aircraft 100. The aircraft data sources 150 can produce aircraft data which relates to the operating environment of the aircraft, including the weather, temperature, air pressure, altitude, and the like, which relates to the performance of the aircraft or of components thereof, for example a speed or acceleration of the aircraft, a torque or power produced by the engines 140, and the like, and/or any other suitable data.

Operators of the aircraft 100 can request that aircraft data produced by the aircraft data sources 150 be periodically or punctually provided to monitoring stations, for example ground-based stations. As detailed hereinbelow, the aircraft 100 can be provided with a communication system for gathering, processing, and transmitting the aircraft data for the operators. For example, a Flight-data Acquisition, Storage and Transmission (FAST™) device can be used. Contained within the communication system is a communication module that can use cellular-, wireless local area network- (WLAN), satellite-based communication technologies, or any other type of technology, for wirelessly communicating the aircraft data off the aircraft.

For example, the communication system can communicate, via the communication module, with a ground-based network 170, which can include one or more cellular networks 172, a public network 174, such as the internet, and one or more private networks or devices, such as a server 176, which can be interconnected in any suitable way. Other examples of private networks can include local area networks (LANs), whether wired or wireless (for example W-Fi networks), cloud-computing networks, and the like. The aircraft data produced by the aircraft data sources 150 can be transmitted, for example, to the server 176 for storage, analysis, or for any other suitable purpose.

Figure 2:
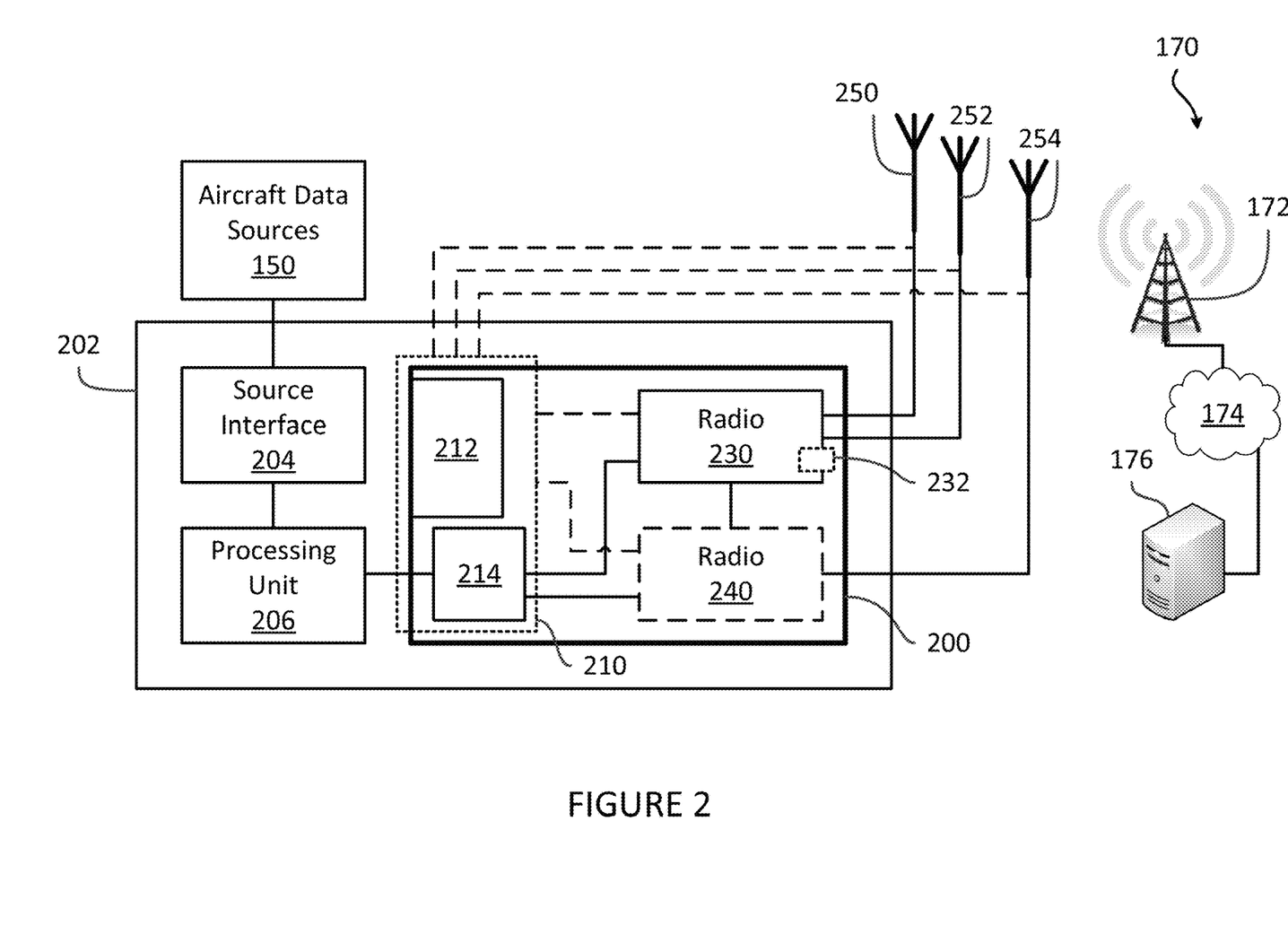
FIG. 2 is a block diagram of an example communication system.

With reference to FIG. 2, an embodiment of the communication module is illustrated at 200, which is a part of a communication system 202. The communication module 200 is composed of an interface 210, and one or more wireless radios 230, 240, and the communication system 202 is composed of a source interface 204, a processing unit 206, and the communication module 200. The source interface 204 is configured for obtaining the aircraft data from the aircraft data sources 150, for example via one or more buses associated with the aircraft data sources. The processing unit 206 is configured for producing messages for transmission by the communication module 200, as described in greater detail hereinbelow.

The communication module 200 is part of the communication system 202 and is at least communicatively coupled to the processing unit 206 of the communication system 202, and to one or more antennas, illustrated as antennas 250, 252, 254. In some embodiments, the communication module 200 is connected to only one antenna, and in other embodiments, the communication module 200 is connected to three or more antennas. The antennas 250, 252, 254 can include one or more cellular radio antennas, one or more wireless LAN antennas, one or more Bluetooth™ or ZigBee™ antennas, one or more ultra-wideband (UWB) or WiMax (IEEE 802.16) antennas, one or more satellite transmission devices, and the like.

The interface 210 implements a physical connection via a physical connector 212 and a digital connection via a digital connector 214. The physical connector 212 serves to physically and removably couple the communication module 200 to the communication system 202. For example, the communication module 200 can be slidably coupled to communication system 202 via the interface 210 by sliding the communication module 200 into a slot of the communication system 202, which can be facilitated by a rail or other protrusion of the interface 210. In another example, the communication module 200 can be plugably coupled to the communication system 202 via the interface 210 by inserting a part of the interface 210 into a port which retains the communication module 200 via the interface 210. Still other embodiments are considered. The interface 210 also allows for the communication module 200 to be removed from coupling with the communication system 202, for example by sliding the communication module 200 in an opposite direction than that in which the communication module 200 was slidably coupled to the communication system 202, or by applying a pulling force to unplug the communication module 200 from the aircraft system 150.

In some embodiments, the interface 210 includes one or more fasteners for securing the communication module 200 to the communication system 202. For example, the interface 210 includes one or more screws which mate with corresponding nuts or threaded inserts within the communication system 202. In another example, the interface 210 includes one or more clips which apply a compressive force to the communication module 200 to secure it against the communication system 202. Still other embodiments are considered. The fasteners of the interface 210 allow for the communication module 200 to be semi-permanently coupled to the communication system 202, for example for an extended period of time, but still allow for removal of the communication module 200, for example to replace an existing communication module 200 with an upgraded communication module 200, for instance having support for newer telecommunication technology. In some embodiments, the particular design of the interface 210, including the fasteners, is selected to maintain the coupling of the communication module 200 to the communication system 202 in a high-vibration environment.

The digital connector 214 of the interface 210 is configured for receiving control signals and messages for transmission from the processing unit 206. As explained hereinbelow, the communication system 202 obtains the aircraft data from the aircraft data sources 150, which in turns provides representations of the aircraft data to the communication module 200 for transmission from the aircraft 100. For example, the processing unit 206 can produce messages for transmission which contain information of interest obtained from the aircraft data. The interface 210 then obtains the messages from the processing unit 206 via the digital connector 214. The digital connector 214 of the interface 210 can use any suitable standards, communication protocols, and can be implemented in any suitable way.

Thus, in some embodiments, the interface 210 is composed of the physical connector 212, which is configured for physically removably coupling to the communication system 202, and the digital connector 214 which is configured for coupling to the processing unit 206. The interface 210 is configured for conducting the messages, produced by the processing unit 206 from the aircraft data, from the communication system 202 (via the physical connector 212) to the radio(s) 230, 240 (via the digital connector 214) for transmission. The interface 210 allows the communication module 200 to be coupled or decoupled from the communication system 202, as necessary. For example, a particular communication module 200 which, at a first time, is not coupled to the communication system 202 can be coupled thereto at a second, later time, by way of the interface 210, and can later be decoupled therefrom at a third, still later time, again by way of the interface 210. The decoupling of the particular communication module 200 can be performed, for instance, in order to replace the particular communication module 200 with a new, upgraded version of the communication module 200.

The radios 230, 240 are configured for transmitting, via at least one of the antennas 250, 252, 254, the messages produced by the processing unit 206. In the embodiment shown in FIG. 2, two radios 230, 240 are shown; however, it should be understood that the radio 240 is optional, and that any number of radios can be included as part of the communication module 200. For instance, the communication module 200 can include multiple separate radios, for example one or more cellular radios, one or more wireless LAN radios, one or more UWB/WiMAX radios, one or more Bluetooth™/Zigbee™ radios, one or more satellite radios, and the like. Each of the radios 230, 240 can be separately connected to the processing unit 206 via the interface 210 in any suitable way. In some embodiments, the radios 230, 240 receive both control signals and messages for transmission from the processing unit 206. For example, the radios 230, 240 are provided with a data signal, which contains the messages for transmission, and control signals, which instruct the radios 230, 240, on operation.

In some embodiments, the radios 230, 240 each include at least one radio-frequency (RF) connector. The RF connector serves to couple the radios 230, 240 with a respective one of the antennas 250, 252, 254, and can use coaxial cables, Ethernet cables, fiber optic cables, or any other suitable cable technology. In some alternative embodiments, the radios 230, 240 are coupled to the interface 210 to cause the messages to be transmitted via the antennas 250, 252, 254 by first sending the messages to the interface 210, which is in turn coupled to the antennas 250, 252, 254. Optionally, the messages can be sent to or routed through part of the communication system 202, for example through the processing unit 206, using any suitable techniques and communication protocols.

In embodiments where the radio 230 is configured for communicating over a cellular network, the radio 230 can be provided with a subscriber identity module (SIM) card 232. The SIM card 232 can be inserted into a slot or port of the communication module 200, affixed to a circuit board or other component of the communication module 200 or the communication system 202, or provided in any other suitable fashion, as appropriate. The radio 230 is configured for using the information stored in the SIM card 232, for instance a unique identifier, when transmitting the messages produced by the processing unit 206. For example, the processing unit 206 can use the unique identifier stored in or otherwise obtained from the SIM card 232 to access the cellular network. In some embodiments, both radios 230, 240 can be provided with SIM cards.

For reference, the source interface 204 and the processing unit 206 serve to obtain and process the aircraft data produced by the aircraft data sources 150. To produce messages for transmission, for example to operators of the aircraft 100. The source interface 204 can include any suitable number of buses, connectors, and the like, for interfacing with the aircraft data sources 150 and for obtaining aircraft data therefrom.

The processing unit 206 can be composed of a microcontroller or other computing device. In some embodiments, the processing unit 206 is based on a commercially available computing platform such as a Raspberry Pin™ or other similar small-scale self-contained computing platform. In other embodiments, the processing unit 206 is based on a custom computing platform implementation, for example an application-specific integrated circuit (ASIC) or a field-programmable gate array (FPGA). The processing unit 206 can be coupled to the interface 210 using any suitable techniques. For example, the interface 210 and the processing device 206 can be connected via one or more wired or wireless connectors, and the like.

The processing unit 206 is configured for receiving the aircraft data from the aircraft data sources 150 via the source interface 204, contained within the communication system 202. The processing unit 206 is also configured for processing the aircraft data to identify information of interest relating to the aircraft 100. In some embodiments, the processing unit 206 is preprogrammed to identify particular information which is of interest, for example of interest to operators of the aircraft 100. In other embodiments, the processing unit 206 can receive instructions from operators of the aircraft 100 regarding the type of information which is of interest at a given time. For example, the communication module 200 can receive instructions via the antennas 250, 252, 254 in some cases substantially in real-time, and the processing unit 206 can identify within the aircraft data particular information which is of interest.

In one example, the information of interest relates to the speed, acceleration, altitude, etc. of the aircraft 100. In another example, the information of interest relates to the weather, air pressure, temperature, etc., of the environment in which the aircraft 100 is operating. In a further example, the information of interest relates to the performance of one or more components of the aircraft, for instance the power, torque, etc., produced by the engines 140. In a still further example, the information of interest relates to various actions performed by a pilot of the aircraft 100. Still other information can be identified as being of interest, either based on pre-established parameters or in response to instructions received at the communication module 200.

The processing unit 206 is further configured for producing, for transmission, at least one message which contains the information of interest which relates to the aircraft 100. In some embodiments, the processing unit 206 produces messages periodically, such that each message comprises information of interest which relates to the time period between two adjacent periodic messages. In other embodiments, the processing unit 206 produces messages punctually, for instance in response to a particular parameter of the aircraft data exceeding a threshold or indicating a potential fault in the aircraft 100. Still other approaches are considered. For example, a given message contains only information of interest relating to a particular parameter of the aircraft 100. In another example, each message contains substantially all information of interest from the aircraft data, for instance for a particular time period. The messages can have any suitable length, and can be encoded as appropriate, including the use of one or more encryption techniques. Once the processing unit 206 has produced the messages, the messages can be transferred to the communication module 200 for transmission.

It should be noted that any of the components of the communication module 200, including the interface 210, the radios 230, 240, and the communication module 200 itself, as well as the components of the communication system 202, may be subject to various regulations imposed by regulatory bodies overseeing telecommunications standards and/or aviation standards. In some embodiments, the communication module 200, or components thereof, are subjected to regulatory tests prior to assembly and/or prior to the communication module 200 being removably coupled to the communication system 202.

The regulatory standards can include limits on electromagnetic interference, standards for lightning or surge tolerance, operation in extreme temperature or other conditions, and the like, while maintaining reliability and data integrity. Regulatory bodies can include aviation-related regulatory bodies, such as the Federal Aviation Administration (FAA) of the USA, the Civil Aviation Directorate or Transport Canada Civil Aviation (TCCA) of Canada, the European Aviation Safety Agency (EASA), and can include telecommunication-related regulatory bodies, such as the Federal Communications Commission (FCC) of the USA, the Canadian Radio-television and Telecommunications Commission (CRTC) of Canada, the Conformité Européenne regulators in Europe, and the like.

Figure 3:
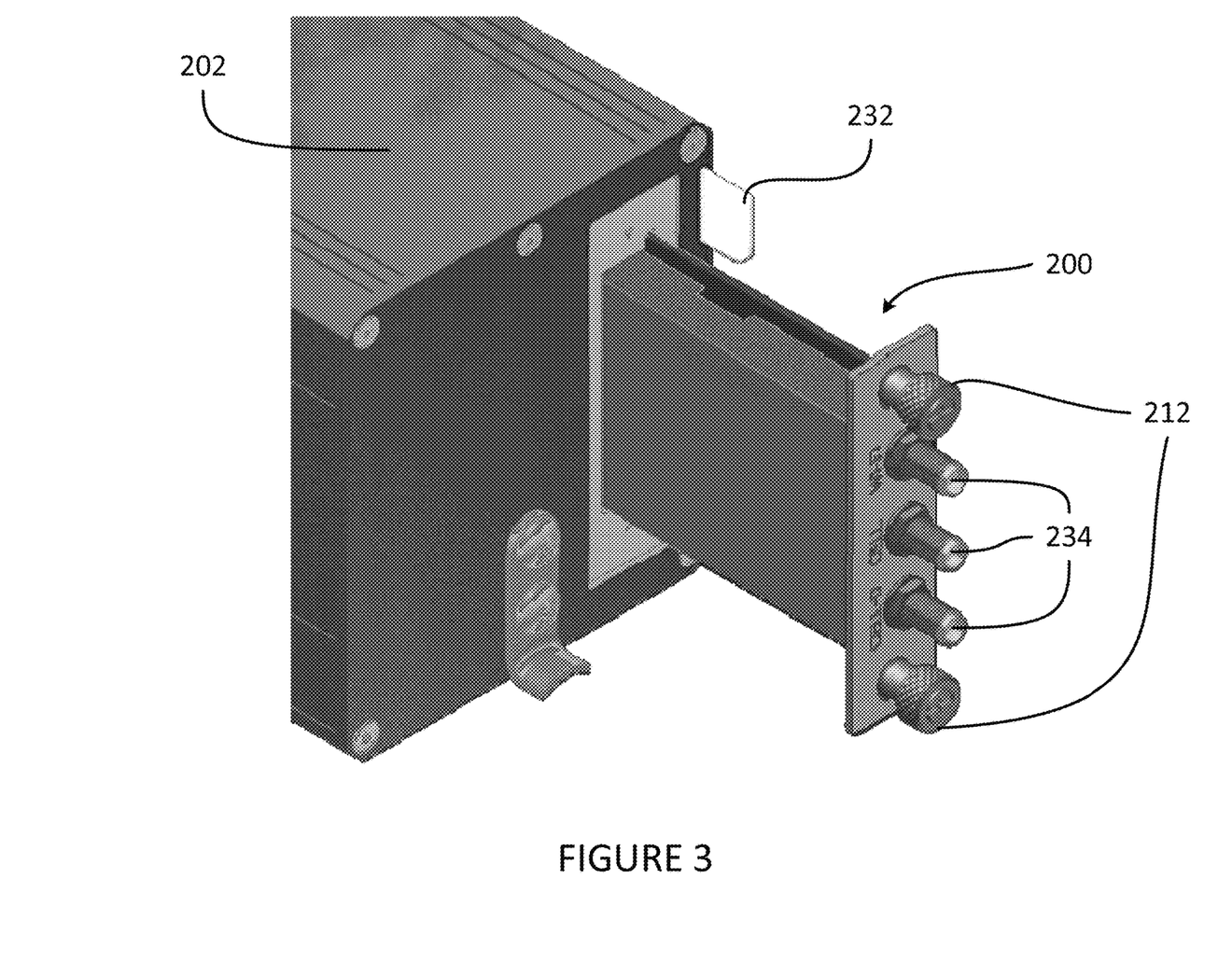
FIG. 3 is a perspective view of an example communication module of the communication system of FIG. 2 according to an embodiment.

With reference to FIG. 3, in some embodiments, the communication module 200 is implemented on a printed circuit board (PCB), for example as an electronics card. In this example communication module 200, the physical interface 212 includes a pair of screws, which serve to semi-permanently retain the communication module 200 within the communication system 202. Although illustrated here as screws 212, it should be noted that other types of fasteners are also considered for the physical interface 212. In addition, RF connectors 234 are shown as coaxial connectors for receiving a coaxial-type cable. Other implementations of the RF connectors 234 are also considered. For instance, although in FIG. 3 the RF connectors 234 are located on the communication module 200, in other implementations the RF connectors 234 can be located on the exterior of the communication system 202 and coupled to the communications module 200 via the interface 210.

Figure 4:
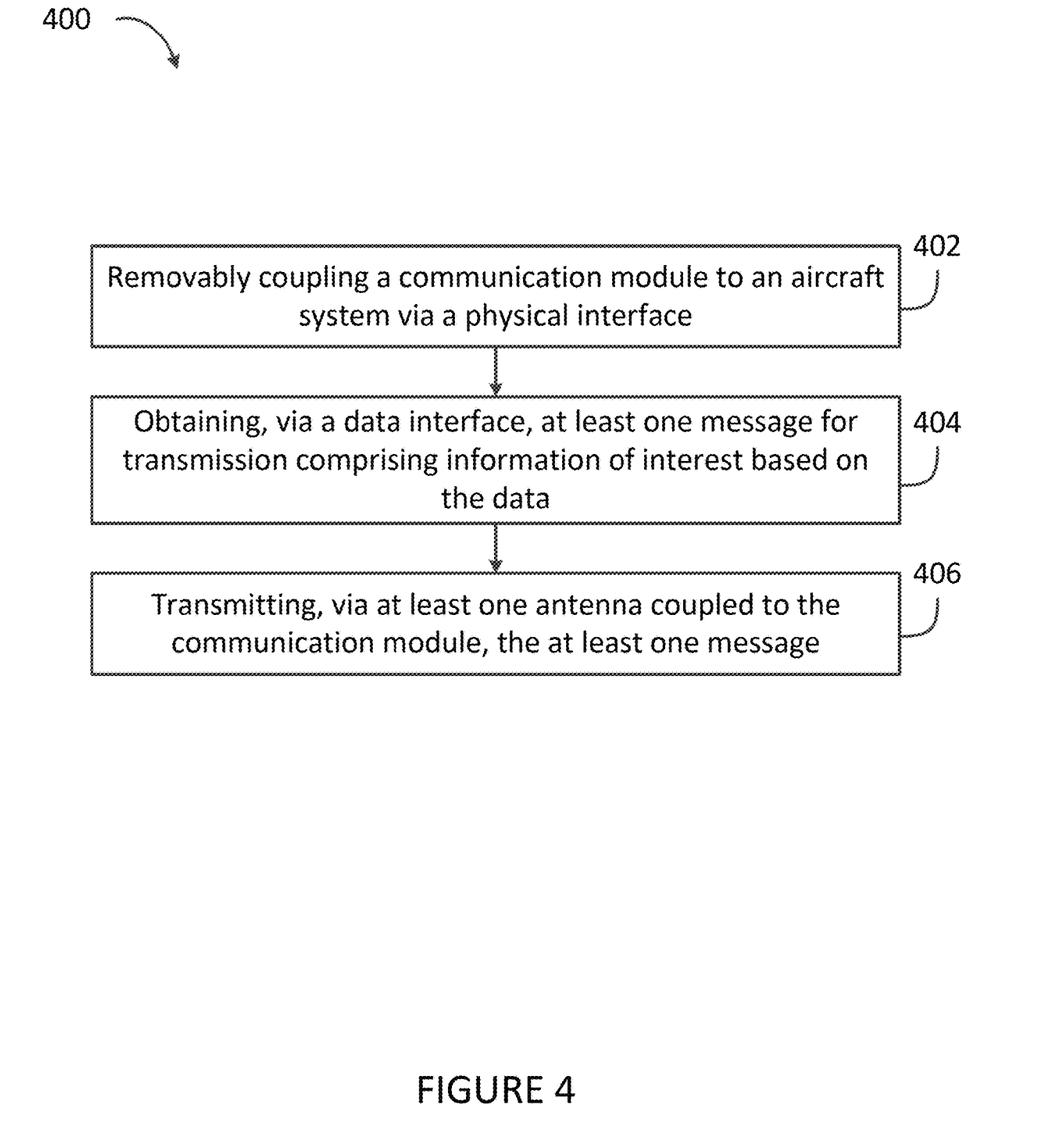
FIG. 4 is a flowchart of an example method for transmitting aircraft data from an aircraft.

With reference to FIG. 4, a method 400 for transmitting aircraft data from an aircraft, for example the aircraft 100, is illustrated. At step 402, a communication module, for example the communication module 200, is removably coupled to an aircraft system via a physical interface, for example the interface 210. In some embodiments, the communication module 200 is coupled via one or more fasteners, for example the screws 212.

At step 404, one or more messages for transmission are obtained via a data interface. The messages each contain information of interest and are obtained based on aircraft data, which can be produced, for instance, by the aircraft data sources 150. At step 406, the messages are transmitted via at least one antenna, for example the antennas 250, 252, 254. The messages can be transmitted by one or more radios, for example the radios 230, 240, which can be a cellular radio, a wireless LAN radio, a satellite radio, and the like.

Figure 5:
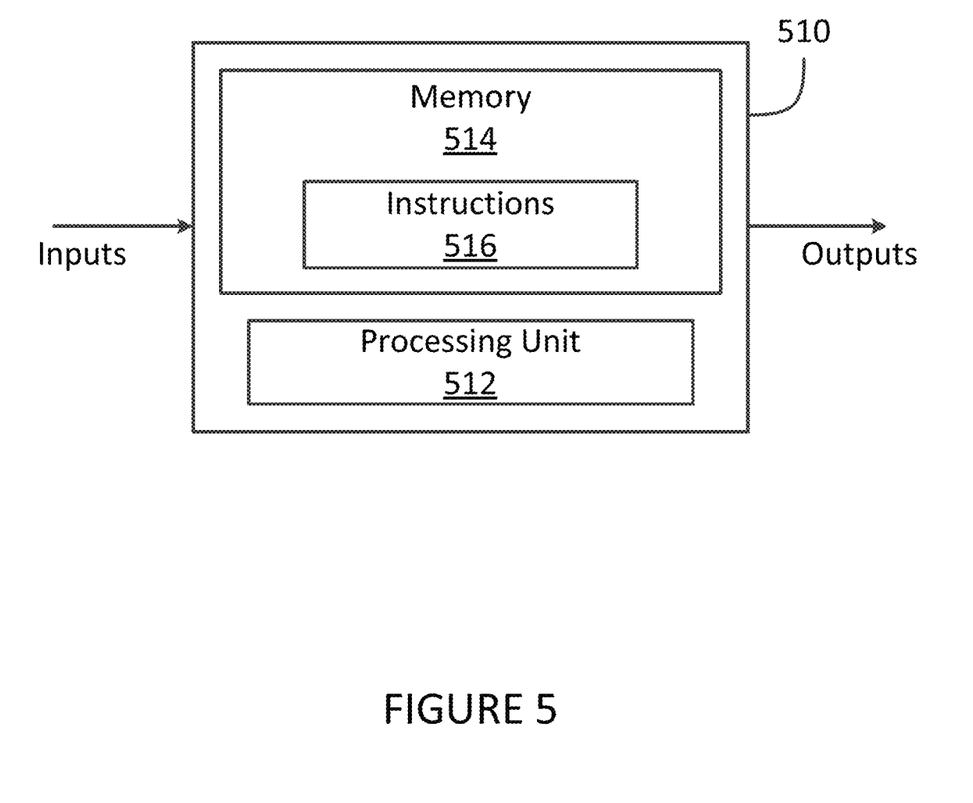
FIG. 5 is a block diagram of an example computer system for implementing part or all of the method of FIG. 4.

With reference to FIG. 5, the method 400 may be implemented at least in part by a computing device 510, comprising a processing unit 512 and a memory 514 which has stored therein computer-executable instructions 516. For example, at least some parts of the communication module 200 and/or the communication system 202, for instance the processing unit 206, may be embodied as the computing device 510. The processing unit 512 may comprise any suitable devices configured to implement the method 400 such that instructions 516, when executed by the computing device 510 or other programmable apparatus, may cause the functions/acts/steps performed as part of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

The methods and systems for transmitting aircraft data from an aircraft described herein may be implemented in, or implement, a high level procedural or object oriented programming or scripting language, or a combination thereof, to communicate with or assist in the operation of a computer system, for example the computing device 510. Alternatively, the methods and systems described herein may be implemented in, or implement, assembly or machine language. The language may be a compiled or interpreted language. Program code for implementing, or implemented by, the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A communication module for transmitting data from an aircraft, comprising:
   a first connector for physically and removably coupling the communication module to a data acquisition and transmission system provided on-board the aircraft, the data acquisition and transmission system configured to obtain the data from at least one data source within the aircraft;
   a second connector for communicatively coupling the communication module to a processing unit of the data acquisition and transmission system and for obtaining, from the processing unit, radio control signals and at least one message for transmission from the data acquisition and transmission system, the at least one message comprising information of interest identified based on the data; and
   at least one radio for receiving the radio control signals and being operated based thereon to wirelessly transmit, from the data acquisition and transmission system to at least one component of a ground-based network, the at least one message via at least one antenna.

2. The communication module of claim 1, wherein the first connector is configured for being removably coupled to the data acquisition and transmission-system via at least one fastener.

3. The communication module of claim 1, further comprising, for each of the at least one radio, a respective radio-frequency connector, wherein each of the at least one radio is coupled to a respective one of the at least one antenna via the respective radio-frequency connector.

4. The communication module of claim 1, wherein the at least one radio is coupled to the second connector, and further wherein the at least one message is received at the at least one radio via the second connector.

5. The communication module of claim 1, wherein the at least one radio is configured for transmitting the at least one message over a cellular network.

6. The communication module of claim 1, wherein the at least one radio is configured for transmitting the at least one message over a satellite network.

7. The communication module of claim 1, wherein the at least one radio is configured for transmitting the at least one message over a wireless local area network.

8. The communication module of claim 1, wherein the at least one radio includes at least one subscriber identity module (SIM) card.

9. The communication module of claim 1, wherein at least some of the first connector, the second connector, and the at least one radio are subject to one or more certification regulations imposed by at least one of a telecommunication standards organization and an aviation standards organization.

10. A data acquisition and transmission system for transmitting data from an aircraft, comprising:
    a source interface coupled to at least one data source within the aircraft for obtaining the data therefrom;
    a processing unit for
       processing the data to identify, within the data, information of interest; and
       producing at least one message for transmission, the at least one message comprising the information of interest; and
    a communication module according to claim 1 configured to be coupled to the processing unit.

11. The data acquisition and transmission system of claim 9, wherein the processing unit is a microcontroller.

12. A method for transmitting data from an aircraft, comprising:
    removably coupling, via a first connector, a communication module to a data acquisition and transmission-system provided on-board the aircraft, the data acquisition and transmission system configured to obtain the data from at least one data source within the aircraft;
    obtaining, via a second connector and from a processing unit of the data acquisition and transmission system, radio control signals and at least one message for transmission, the at least one message comprising information of interest identified based on the data, the second connector communicatively coupling the communication module to the processing unit; and
    wirelessly transmitting, via at least one antenna coupled to the communication module, the at least one message from the data acquisition and transmission system to at least one component of a ground-based network,.

13. The method of claim 12, wherein the removably coupling the communication module to the data acquisition and transmission system comprises fastening the communication module to the data acquisition and transmission system via at least one fastener.

14. The method of claim 12, wherein the transmitting the at least one message comprises transmitting the at least one message via a respective radio-frequency connector for each of the at least one antenna.

15. The method of claim 12, wherein the transmitting the at least one message comprises transmitting the at least one message over a cellular network.

16. The method of claim 12, wherein the transmitting the at least one message comprises transmitting the at least one message over a satellite network.

17. The method of claim 12, wherein the transmitting the at least one message comprises transmitting the at least one message over a wireless local access network.

18. The method of claim 12, wherein the transmitting the at least one message comprises encoding the at least one message with a unique identifier obtained from at least one subscriber identity module (SIM) card.

19. The method of claim 12, wherein at least some of the steps of removably coupling, obtaining, and transmitting are performed using hardware subject to one or more certification regulations imposed by at least one of a telecommunication standards organization and an aviation standards organization.

* * * * *